(12) United States Patent
Petit

(10) Patent No.: US 7,880,418 B2
(45) Date of Patent: Feb. 1, 2011

(54) ELECTROMECHANICAL DRIVE SYSTEM, IN PARTICULAR FOR PROGRESSIVE CAVITY PUMPS FOR OIL WELLS

(75) Inventor: Christian Petit, Angouleme (FR)

(73) Assignee: Moteurs Leroy-Somer, Angouleme (FR)

( * ) Notice: Subject to any disclaimer, the term of this patent is extended or adjusted under 35 U.S.C. 154(b) by 303 days.

(21) Appl. No.: 11/992,959

(22) PCT Filed: Oct. 12, 2006

(86) PCT No.: PCT/FR2005/051022

§ 371 (c)(1),
(2), (4) Date: Jun. 2, 2008

(87) PCT Pub. No.: WO2007/042732

PCT Pub. Date: Apr. 19, 2007

(65) Prior Publication Data

US 2008/0246427 A1    Oct. 9, 2008

(30) Foreign Application Priority Data

Oct. 12, 2005  (FR) .................................. 05 53104

(51) Int. Cl.
*H02P 3/00* (2006.01)

(52) U.S. Cl. ................... 318/474; 318/144; 318/370; 318/376; 318/400.3; 318/400.31; 318/379; 318/508; 322/27; 700/282; 166/53; 307/11; 417/44.11; 417/44.1; 417/45; 361/24; 361/23; 361/30; 361/31; 363/81

(58) Field of Classification Search ................. 388/932; 361/23, 24, 30, 31; 417/223, 44.11, 45, 44.1; 322/12, 40, 6, 27; 310/92, 102 R; 307/127, 307/11; 318/258, 56, 362, 599, 261, 273, 318/275, 277, 445, 474, 370, 376, 400.3, 318/400.31, 379, 508, 144; 363/81; 700/282
See application file for complete search history.

(56) References Cited

U.S. PATENT DOCUMENTS 4,000,446 A * 12/1976 Vandevier et al. ............. 361/31
4,021,700 A *  5/1977 Ellis-Anwyl ................. 361/28

(Continued)

FOREIGN PATENT DOCUMENTS

GB          690 090 A         9/1950

(Continued)

*Primary Examiner*—Rita Leykin
(74) *Attorney, Agent, or Firm*—Oliff & Berridge, PLC

(57) ABSTRACT

The following invention is an electromechanical system (1) that is to be connected to an electricity supply (7), comprising:
  an electric machine (2) that can operate as an independent generator with a rotating shaft, and
  a switching system (9) allowing
  i) in the first configuration, the electric machine to operate as a motor in the case where the connected device (4) is normally driven or as a generator in the case where the coupled device is normally driving, and
  ii) in the second configuration, the electric machine to operate as an independent generator, the electrical energy generated by the electric machine (2; 22) being dissipated in the machine and in a dissipative load (13).

34 Claims, 3 Drawing Sheets

U.S. PATENT DOCUMENTS

Figure 5:
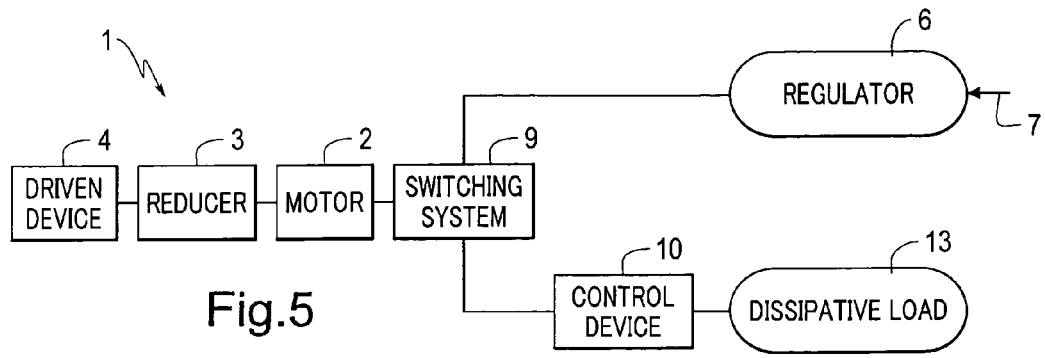

| | | | | |
|---|---|---|---|---|
| 4,262,209 A * | 4/1981 | Berner | .......................... | 290/7 |
| 5,020,491 A * | 6/1991 | Mashino | .................. | 123/192.1 |
| 5,028,804 A * | 7/1991 | Lauw | ....................... | 290/40 C |
| 5,053,662 A * | 10/1991 | Richter | ...................... | 310/90.5 |
| 5,198,734 A | 3/1993 | Johnson | | |
| 5,442,276 A * | 8/1995 | Schwartz et al. | ............... | 322/25 |
| 5,749,416 A | 5/1998 | Belcher | | |
| 5,754,420 A * | 5/1998 | Luce | ......................... | 363/102 |
| 6,079,489 A | 6/2000 | Hult et al. | | |
| 6,113,355 A | 9/2000 | Hult et al. | | |
| 6,244,825 B1 * | 6/2001 | Sasaki et al. | ............. | 417/44.11 |
| 6,825,575 B1 * | 11/2004 | Edelson | .................... | 290/40 C |
| 7,105,938 B2 * | 9/2006 | Edelson | .................... | 290/40 A |
| 7,330,779 B2 * | 2/2008 | Schulz | ....................... | 700/282 |
| 7,437,215 B2 * | 10/2008 | Anderson et al. | ........... | 700/282 |
| 7,534,096 B2 * | 5/2009 | Schulz | ....................... | 417/45 |
| 2005/0045323 A1 | 3/2005 | Hult | | |
| 2005/0205249 A1 | 9/2005 | Boyles | | |
| 2005/0281680 A1 * | 12/2005 | Schulz | .................... | 417/44.11 |
| 2005/0281681 A1 * | 12/2005 | Anderson et al. | ........ | 417/44.11 |
| 2005/0283277 A1 * | 12/2005 | Schulz | ....................... | 700/282 |

FOREIGN PATENT DOCUMENTS

| | | |
|---|---|---|
| JP | A-61-269686 | 11/1986 |
| WO | WO 99/02477 A1 | 1/1999 |
| WO | WO 00/25000 | 5/2000 |

* cited by examiner

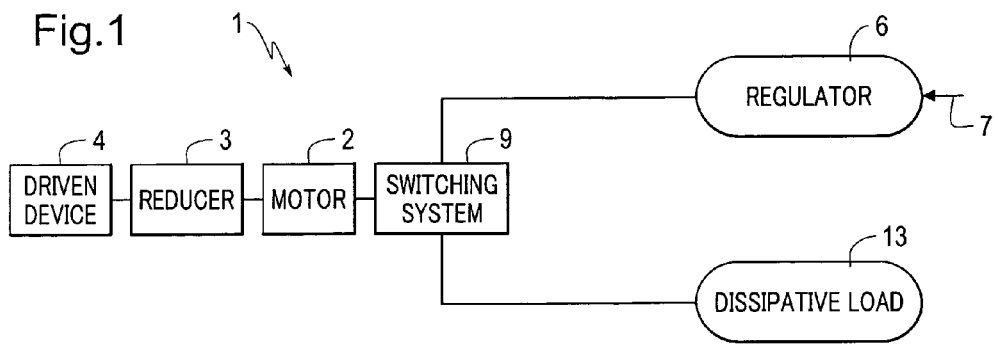
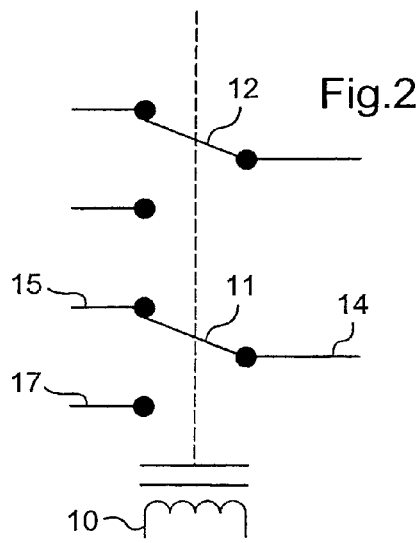
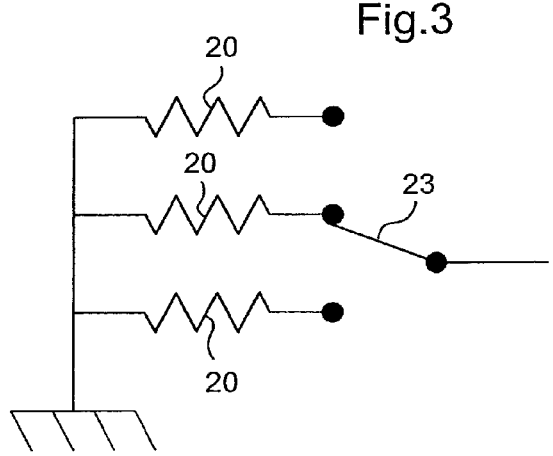
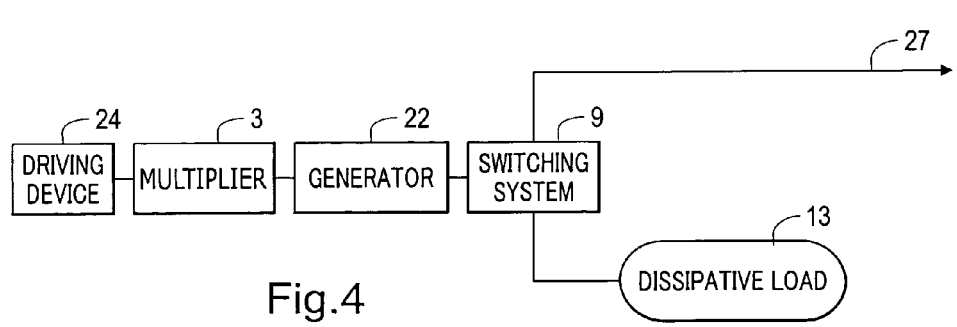

ELECTROMECHANICAL DRIVE SYSTEM, IN PARTICULAR FOR PROGRESSIVE CAVITY PUMPS FOR OIL WELLS

The following invention is related to the electrical systems to be coupled to driving or driven devices.

The invention relates more particularly but not exclusively to the drive systems of driven devices that are capable of storing a relatively large potential energy during their operation.

In the case where the electricity supply to the system fails, this potential energy is likely to suddenly drive the system in the opposite direction. This is known as backspin and it can cause uncontrolled rotation with backspin speeds reaching levels that could be dangerous for personnel and equipment.

This problem occurs, for example, in progressive cavity pumps used in oil wells.

When in operation, such pumps store potential energy in one of two forms, torsion energy in the kelly of the pump which spins about itself on the one hand and hydrostatic energy corresponding to the liquid column in the well on the other.

Traditionally, these pumps are driven by asynchronous electric motors and pulley systems providing a reduction ratio of 2 to 5 approximately.

A braking device is included to avoid sudden back-spinning of the system caused by the stored potential energy when the motor stops.

This device includes, for example, a mechanical disc or centrifugal brake or a hydraulic braking device.

The publications WO 99/2477, WO 00/25000, US 2005/0045323, U.S. Pat. No. 6,079,489, U.S. Pat. No. 6,113,355 and U.S. Pat. No. 5,749,416 give details of relatively complex examples of braking devices.

The publication "patent abstract of Japan JP 61 269 686" describes a system comprising an asynchronous driving motor for a water pump. The motor includes a wound rotor.

During a braking operation, the stator windings discharge into a dissipative circuit while the rotor windings are powered by the electricity supply.

Such a system cannot function in the event of a power cut as the motor does not operate as an autonomous generator.

The invention aims, amongst other things, to propose an electromechanical system to be connected to a driving and/or driven device that allows backspin to be avoided in the case where changes in operating conditions occur, notably in the power supply.

The electromechanical system is configured, for example, to be connected to a driven device and includes a motor.

A driven device is, for example, the rod of a progressive cavity pump.

The electromechanical system can be configured to be connected to a driving device and can thus include a generator. A driving device is, for example, a wind turbine.

The invention concerns, according to one of its aspects: an electromechanical system that is to be connected to a power supply, comprising:

an electric machine with a rotating shaft and
a switching system allowing:
in a first configuration, the electric machine to operate as a motor in the case where the connected device is normally driven or as a generator in the case where the coupled device is normally driving, and
in a second configuration, the electric machine to operate as an independent generator, the electrical energy generated by the electric machine being dissipated in the machine and in a dissipative load.

The dissipative load connected to the machine can ensure a greater or lesser part of the energy dissipation when the machine is operating as an autonomous generator. A significant portion of energy dissipation can occur in the machine itself, especially in the stator windings, particularly in the case where the dissipative load does not represent a significant impedance and its impedance is appreciably lower than the internal impedance of the machine.

Accordingly, the term "dissipative load" should not be understood in the limiting sense and the power dissipated in this load can be much lower than is dissipated in the machine. When the machine is short-circuited, the majority of the energy produced by the machine is dissipated within it. The dissipative load is thus reduced to the conductors, contacts and/or components that are responsible for this short circuit. In the case where their internal impedance is very low, the power dissipated in the short circuit will be negligible compared to the power dissipated in the machine.

This invention makes it possible to create a torque using the electric machine.

The term "independent generator" refers to a generator that can operate without an external electrical feed from the power supply.

When the electrical machine operates as an independent generator, the magnetic field generated by the rotor to excite the stator windings may be due to the presence of permanent magnets and/or coils powered by an integrated exciter or powered by the current produced by the machine. The machine can be an asynchronous machine whose excitement is provided by one or more capacitors connected to the stator terminals.

The electrical machine may comprise, in particular embodiments, a permanently excited rotor, in particular a rotor with permanent magnets. The use of a machine with permanent magnets allows reliability to be improved.

The electromechanical system may not contain any battery designed to be an auxiliary source of energy to feed the windings of the electric machine when it operates as an independent generator and may not have any external generator performing the same task.

Where the electric machine comprises a permanent magnet rotor, the rotor is advantageously a flux concentrated rotor with permanent magnets engaged between poles pieces. The machine may in particular include permanent magnets that are radially-orientated with the polar axis of each magnet orientated in the circumferential direction.

As a function of the impedance of the dissipative load in particular, the shape of the torque/speed curve can be modified and the torque, notably, can increase until it reaches a maximum for a certain rotational speed and then decline. Low dissipative load impedance can make it possible to achieve maximum torque relatively quickly. The speed at which the torque is at its maximum is advantageously, for example, less than or equal to 50 rpm, even better 40 rpm, better still 35 rpm.

This may cause significant braking of the coupled device straight after the loss of the power supply, and allow the connected device to continue to rotate at a relatively low speed.

Even if the braking torque is in the vicinity of the nominal torque, the energy dissipation remains relatively low because the speed is relatively slow. This allows the system to be maintained in this state without excessive overheating of the machine.

In the case where the coupled device is a pump, in particular an oil well pump such as the progressive cavity type, it can allow the liquid column in the well to drain very slowly.

When the power supply is re-established, the system can be restarted without impact to production caused by the down time required to empty and refill the well.

In examples of implementing the invention, the system may or may not have a speed reducer or multiplier between the shaft and the device to be coupled to the electromechanical system.

The presence of a speed reducer also allows for a benefit from inertial braking.

This invention can be used to reduce, in a relatively simple, reliable and economical way, the risk of backspin, for example in the case of a failure in the power supply to which the system is connected.

When the electric machine is a motor, the switching system can feed the motor in the first configuration to drive the coupled device.

The speed reducer can be reducing gears, which improves reliability.

The reduction ratio can be greater than 6, notably between 7 to 15, which allows the motor to be used at relatively high speeds, for example, between 2,000 and 9,000 rpm in normal operating mode.

The system may comprise the dissipative load. The latter may have at least one electrolytic or metal resistor, for example at least one metal resistor immersed in a liquid bath.

The dissipative load may, where appropriate, be reduced to short-circuited conductors and present a relatively low impedance, appreciably less than the internal impedance of the windings of the machine thus short-circuited. This may have the advantage of ensuring that the machine is outputting, when driven by the coupled device, on its own internal impedance.

This can provide relatively significant braking torque for low rotation speeds, which may be of interest for the strong braking of a coupled device as soon as the power supply disappears, as mentioned earlier.

The dissipative load may be linked to the terminals of the machine simply through one or more switches, which can be in the form of electromechanical relays or electronic components such as thyristors or power transistors.

In examples of implementing the invention, the dissipative load is connected to the machine without the current produced by the machine flowing through a relatively complex electronic device such as an inverter or a regulator, when the machine is working as an independent generator. In exemplary embodiments, the dissipative load may be connected to the machine without that connection involving power electronic components.

When the dissipative load comprises has an electrolytic resistor, having at least two electrodes immersed in an electrolyte, the level of the latter may be changed in order to vary the impedance.

The switching system may be configured to automatically change from the first configuration mentioned above to the second configuration when there is a voluntary or involuntary cut-off or failure in the electricity supply to the electric machine or the electricity network fed by it and/or stopping of the machine.

The switching system may include at least one relay with a coil which is, for example, directly or indirectly powered by the electricity supply.

The switching system may be configured to remain in the second configuration until a predefined command is received.

Sending this predefined command depends, for example, on the voltage observed in the machine, a time delay or rotational speed of the machine.

The electrical system may include a frequency regulator to which the motor is connected. The predefined command can be sent by the frequency regulator, for example. When the machine operates as an independent generator, the frequency regulator cannot be supplied with electricity nor receive electricity from the machine. In the second configuration the frequency regulator is, for example, disconnected from the electric machine.

In another exemplary embodiment, the system may include a device to control the backspin speed of the machine configured to connect and disconnect the dissipative load in such a way that the backspin speed remains between two thresholds that can be predetermined.

The control device can hence be configured to disconnect the load when the minimum speed threshold is reached and to reconnect when the maximum speed threshold is reached.

The control system for the backspin speed may also be configured to act on the current flowing toward the dissipative load in such a manner that the backspin speed remains between the two predefined thresholds and/or remains approximately constant.

The electromechanical system may hence remain in a predefined speed range until the braking torque is higher than the driving torque and the driving torque remains sufficient to accelerate the system.

Another aim of the invention is a surface drive system for progressive cavity pumps for oil wells, comprising:
 a motor with an output shaft,
 a speed reducer, preferably a gear reducer, between the output shaft and the pump drive rod,
 a dissipative load,
 a switching system configured to allow,
 in a first configuration, the motor to be powered by an electricity supply in order to drive the pump drive rod of the pump in an initial direction, and
 in a second configuration where the output shaft is driven in rotation in the opposite direction to the first, the transfer of the electrical energy generated by the motor thus driven toward the dissipative load, the switching system being configured to switch automatically to the second configuration, in particular in the case of a cut in the power supply.

The electric motor may be connected to a frequency regulator.

The reduction ratio may be greater than 6, in particular ranging from 7 to 15.

The motor may be of the permanent magnet type.

The invention has for further objet, according to another of its aspects, a surface drive system for progressive cavity pumps for oil wells, comprising:
 a motor with stator windings and a rotor with permanent magnets, in particular a flux concentration rotor,
 a switching system configured to enable in a first configuration, the motor to be supplied with electricity, and in a second configuration, to short-circuit the stator windings in the case of an accidental interruption in the electricity supply to the motor, for example during an electricity supply outage.

Figure 6:
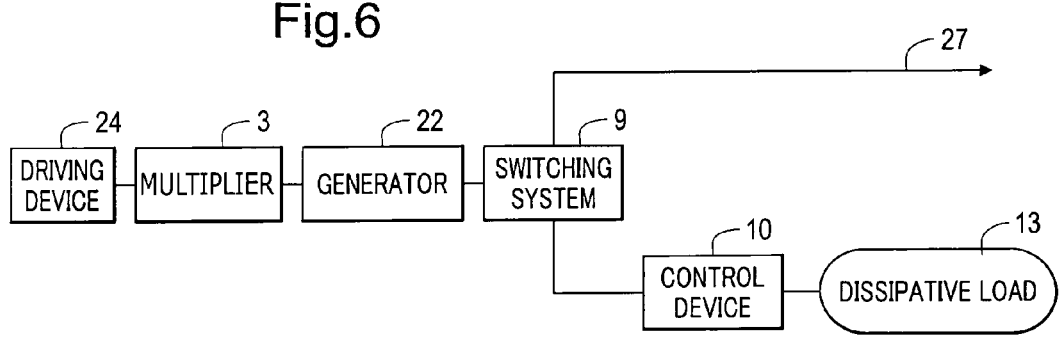
Figure 7:
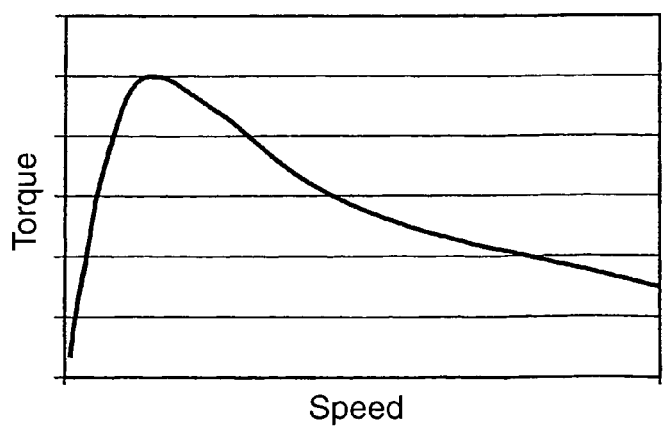
Figure 8:
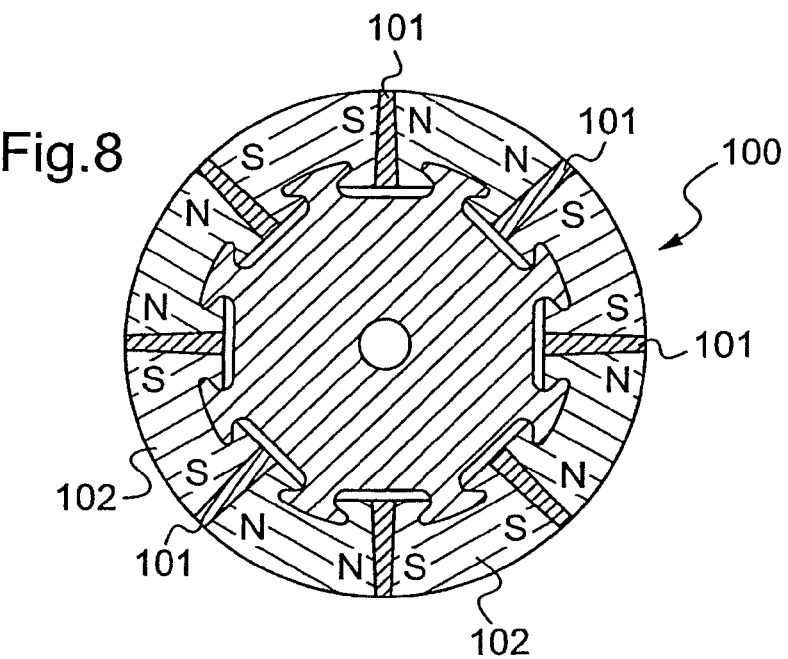
Figure 9:
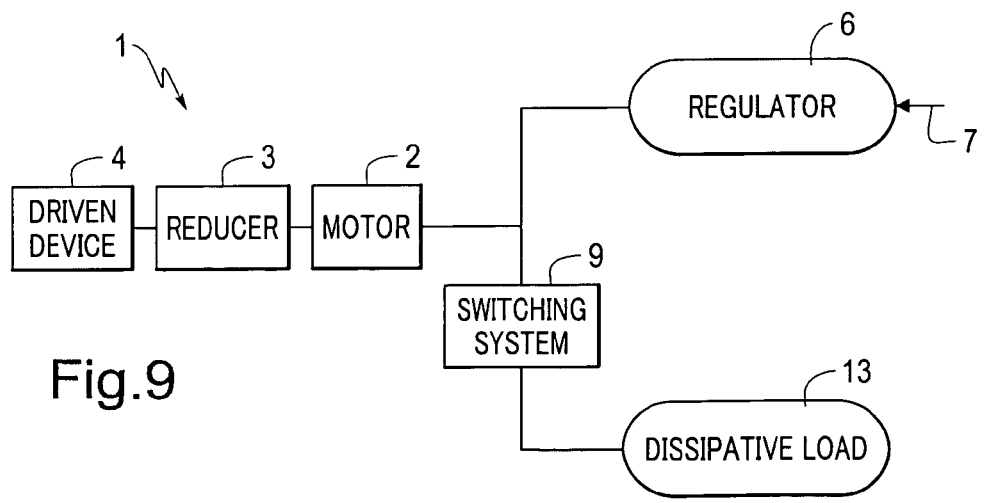

The invention may be better understood by reading the detailed description of exemplary embodiments (not exhaustive) that follows and by examining the drawings attached, in which:

FIG. 1 is a block diagram of an electromechanical system according to an exemplary embodiment of the invention, FIG. 2 is a schematic representation of a relay switching system, FIG. 3 illustrates the possibility for the dissipative load to include several layers of resistors that are selectable, FIGS. 4 and 9 are block diagrams of other examples of electromechanical systems, FIGS. 5 and 6 are block diagrams of electromechanical systems with a backspin speed control system, FIG. 7 schematically represents, in cross-section, an example of a permanent magnet rotor, and FIG. 8 is an example of the braking torque/speed development curve.

The electromechanical system 1 shown in FIG. 1 comprises an electrical machine 2 that includes an electric motor in the example under consideration.

This motor comprises, for example, a stator and a rotor with permanent magnets. The stator is, for example, with concentrated or distributed winding. The rotor comprises, for example, magnets on the surface or magnets between the poles.

FIG. 8 is an example of a rotor 100 with permanent magnets 101, arranged radially between pole pieces 102.

This type of rotor is a flux-concentration rotor, which can allow for a reduction of the short-circuit current and reduce the risk of overheating and/or demagnetisation of the magnets. The motor, for example, is of the type described in U.S. Pat. No. 6,891,299. The associated stator windings can be concentrated or distributed.

The electromechanical system 1 also includes, in the example under consideration, a gear reducer 3 allowing the reduction of the rotational speed of the motor 2 and to drive a driven device 4, for example, a driving rod of a progressive cavity pump situated at the bottom of an oil well.

The reducer 3 achieves, for example, a relatively high reduction factor, for example above 6, notably between 7 and 15.

The motor 2 is usually supplied by a frequency regulator 6, which is connected to an electricity supply 7.

The motor 2 is powered by the regulator 6 through a switching system 9. The latter can be in the first configuration in which motor 2 is powered by regulator 6 and a second configuration in which motor 2 is connected to a dissipative load 13.

The switching system 9 comprises, for example, at least one electronic and/or electromechanical switch which makes it possible to connect motor 2 either to regulator 6 or the dissipative load 13.

In an implementation example of the invention, the switching system 9 comprises at least one electromechanical coil relay 10 and a series of contacts 11.

The series of contacts 11 allows, for example, when coil 10 is fed with electricity, for the establishment of the passage of current between the sets of conductors 14 and 15 that are connected to motor 2 and regulator 6 respectively.

In the absence of electricity supply to the coil, the series of contacts 11 links the set of conductors 14 to the set of conductors 17 connected to the dissipative load 13.

Restarting the machine may be, in the implementation examples of the invention, governed for example, by the rotational speed of the machine, voltage observed in the machine or a time delay.

For example, restarting can be prevented as long as the speed is not zero or the voltage at the terminals of the machine is not less than a threshold value.

In the example illustrated, a second series of contacts 12 of electromechanical relays can be used so that electricity supply to coil 10 occurs through this second series of contacts which makes it possible, once the supply to coil 10 has ceased, to prevent it from being excited once again until a predefined action is performed on the switching system 9.

This may avoid the need to restart the motor in the case where the electricity supply 7 is restored after an outage, for example.

The predefined command comes, for example, from the regulator 6 but may also be effected differently, for example via a manual switch.

The dissipative load 13 can be made from low ohmic resistance electrical conductors, in order to short-circuit the terminals of the machine, the majority of the power to be dissipated being dissipated in the machine. Alternatively, the dissipative load 13 may be of higher impedance.

The dissipative load 13 comprises, for example, at least one resistor which is, for example, a metallic or electrolytic resistor.

The metallic resistor is advantageously immersed in a non-combustible liquid bath, which reduces the risk of fire when the electromechanical system is used in an explosive environment, which may be the case in the vicinity of an oil well.

The dissipative load 13 may be made from resistors and/or any other passive or active component that allows electrical energy to be dissipated, for example capacitors and/or self-induction coils.

The dissipative load 13 may also comprise an electrolytic resistor containing at least two electrodes immersed in an electrolyte. If necessary, the level of the electrolyte can be changed to adjust the resistance to a desired value.

The braking torque of the motor is determined by the current that runs through the dissipative load 13. The choice of impedance of the dissipative load will allow the energy to be dissipated in an appropriate manner.

For example, the braking torque can be reduced as necessary as the pump drive rod slows, so that the well can be emptied faster.

The dissipative load 13 may, for this purpose, include several resistant layers 20 of resistors that can be selectively connected to the motor 2, for example, through the switching system 9, as shown in FIG. 3, depending on its rotation speed and/or the voltage at its terminals, so that, for example, the maximum power can be dissipated whilst remaining within limits.

In an illustration example using an electrolytic resistor, the level of the electrolyte varies over time during braking, reducing via controlled drainage, for example.

A reduction in the level of the electrolyte increases resistance and reduces the braking torque. This reduction in the level can be triggered, for example, during the changeover to the second configuration.

The electromechanical system in FIG. 1 allows, in the case where the electricity supply 7 is interrupted, the motor 2 for example to be driven in the opposite direction by the energy accumulated in the driven device.

This rotation can occur at relatively high speeds, taking into account the reduction in reducer 3, which provides inertial braking.

The use of gears in reducer 3 helps to ensure the reliability of the mechanical connection between the driven device 4 and the motor 2.

The driving of the rotor of the motor 2 generates electric energy which is dissipated to a greater or lesser degree in the dissipative load 13 and the motor 2, according to the respective impedances.

The use of a permanent magnet motor contributes to the reliability of the electromechanical system, this type of a motor having the advantage of integrated permanent excitation.

The switching system 9 can be arranged to switch automatically to the configuration where the motor 2 is connected to the dissipative load 13, not only in the case where there is an outage in the power supply 7, but also in the case where the motor stops or the regulator 6 fails, for example.

The braking provided by the motor 2 helps prevent the pump drive rod from rotating at excessive speeds. The potential energy accumulated can thus be dissipated gradually.

When the motor 2 is an asynchronous motor, excitement capacitors will be connected to its terminals.

The invention is also applicable to an electric machine 22 which is driven by a driving device 24 such as a wind turbine through a multiplier 3.

In this case, machine 22 normally functions as a generator and the energy is sent back to an electrical network 27.

If this network 27 disappears, the system will operate empty and presents a risk of uncontrolled rotation; the switching system 9 may then allow generator 22 to be discharged in the dissipative load 13, which procures a braking torque.

The braking of the driven device 4 or driving device 24 can only be effected through the motor 2 or the generator 22, by discharging it in the dissipative load 13, as has just been explained.

However, it is not beyond the scope of this invention when the braking of the driven device 4 or the driving device 24 also involves another braking device, for example, mechanical or hydraulic, which acts, for example, at the same time as the braking torque exerted by the motor 2 or the generator 22 or in a non-simultaneous manner.

This braking device may, for example, become effective on reaching a certain rotational speed of the motor 2 or the generator 22.

FIGS. 5 and 6 showed electromechanical systems with a backspin speed control system 10.

The dissipative load 13 is connected to or disconnected from the machine 2 or 22 via the control device 10 via any means of cutting off the power supply, for example, at least a contact switch or a static electronic switch with a thyristor.

This device 10 is configured so that the rotational speed of the machine is maintained between two thresholds. The dissipative load 13 is disconnected from the machine 2 or 22 when the minimum speed threshold is reached. The electromechanical system, free-wheeling at this point in time, can accelerate under the influence of the driving torque of the connected device 4.

When the maximum threshold speed is reached, the load 13 is connected. The connected device is thereby braked, the braking torque depending on the current in the load 13.

The device 10 hence allows the system to remain within the desired speed range as long as the braking torque is higher than the driving torque and the driving torque remains sufficient to accelerate the system.

In particular, in the case of a machine with a permanent magnet rotor, the voltage supplied by the machine corresponds to the speed, and the switching of the load can occur depending on the output voltage of the machine when the latter is operating as a generator.

The control system 10 may comprise an electromechanical relay that triggers above a certain voltage corresponding to the speed above which the braking must be effected.

The control system 10 may comprise a more complex electronic circuit allowing the adjustment of trigger thresholds.

Instead of using the "all or nothing" type of logic dictated by one or more electronic or electromechanical switches, it is possible to use a control device 10, a regulator, for example, of the PWM chopper or rheostat type, allowing the current between the machine 2 or 22 and the dissipative load 13 to be continually controlled. This can allow a more precise adjustment of the speed.

When the exertion of a relatively high braking torque for a relatively low rotational speed is required in order to, for example, minimize the backspin speed, it may be appropriate to choose a dissipative load 13 whose impedance is less than the internal impedance of the machine, in order to obtain a rapid increase in the torque in relation to speed, as shown in FIG. 7. For example, maximum braking torque for a speed that is less than or equal to 50 rpm can be obtained, for example about 30 rpm. In this type of example where the dissipative load presents low impedance, the rotor is, for example, with permanent magnets and of the flux concentration type.

In the variation shown in FIG. 9, the regulator 6 remains connected to the motor 2 and comprises electronic switches capable of withstanding the voltage induced by the machine 2 when it is operating as a generator.

The term "electricity supply" should be understood in a general sense to include public or private and regional or local power supplies.

The electricity supply is, for example, single-phase approximately 100 V/60 Hz, approximately 220 V/50 Hz, three-phase approximately 400 V/50 Hz or approximately 460 V/60 Hz.

In the examples described above, the electromechanical system has a speed reducer or a multiplier, but in other variants that have not been included, for example for other applications, the electromechanical system is lacking.

The expression "comprising a" must be understood as a synonym for "comprising at least one" unless specified otherwise.

The invention claimed is:

1. An electromechanical system to be connected to an electricity supply, comprising:
   an electric machine that can operate as an independent generator, comprising a rotary shaft; and
   a switching system allowing
   i) in a first configuration, the electric machine to operate as a motor in the case where the coupled device is normally driven or as a generator in the case where the coupled device is normally driving, and
   ii) in a second configuration, the electric machine to operate as an independent generator, the electrical energy generated by the electric machine being dissipated in the machine and in a dissipative load,
   wherein the switching system is configured to short-circuit the electric machine in the second configuration, the majority of the energy discharged by the machine being dissipated within it.

2. The electromechanical system according to claim 1, wherein the switching system is configured to switch automatically from the first configuration to the second configuration in the event of an outage in the electricity supply powering the electric machine or powered by the latter and/or in the event of stopping of the machine.

3. The electromechanical system according to claim 2, wherein the switching system comprises at least one relay with a coil powered by the electricity supply.

4. The electromechanical system according to claim 1, wherein the system comprises a speed reducer or multiplier between the shaft and the device to be connected to the electromechanical system.

5. The electromechanical system according to claim 3, wherein the system comprises a gear reducer.

6. The electromechanical system according to claim 5, wherein the reduction ratio is greater than 6.

7. The electromechanical system according to claim 6, wherein the reduction ratio ranges from 7 to 15.

8. The electromechanical system according to claim 1, wherein the electric machine is a motor, and the switching system allows powering of the motor in the first configuration to drive the coupled device.

9. The electromechanical system according to claim 1, wherein the rotor of the electric machine has permanent magnets.

10. The electromechanical system according to claim 9, wherein the rotor of the machine is of the flux concentration type.

11. The electromechanical system according to claim 1, wherein the machine is self-excited in the second configuration.

12. The electromechanical system according to claim 8, wherein the system comprises a frequency regulator to which the motor is connected.

13. The electromechanical system according to claim 1, wherein the switching system is configured to remain in the second configuration until a predefined command is received.

14. The electromechanical system according to claim 11, wherein the predefined command is issued by the frequency regulator.

15. The electromechanical system according to claim 1, wherein the system comprises a backspin speed control device for the machine configured to connect and disconnect the dissipative load of the machine and/or act upon the current flowing toward the dissipative load so that the backspin speed remains between two predefined thresholds.

16. A surface drive system for progressive cavity pumps for oil wells, comprising:
    a motor with an output shaft, the motor having permanent magnets;
    a gear reducer between the output shaft and pump drive rod;
    a dissipative load;
    a switching system configured to allow:
        in a first configuration, the motor to be powered by an electricity supply and to drive the pump drive rod in an initial direction, and
        in a second configuration where the output shaft is driven in rotation in the opposite direction to the first, the transfer of the electrical energy generated by the motor thus driven toward the dissipative load,
    wherein the switching system is configured to switch automatically to the second configuration in the event of an outage in the electricity supply.

17. The surface drive system according to claim 16, wherein the electric motor is connected to a frequency regulator.

18. The surface drive system according to claim 16, wherein the reduction ratio is greater than 6.

19. A surface drive system for progressive cavity pumps for oil wells, comprising:
    a motor comprising stator windings and a rotor with permanent magnets, and
    a switching system configured to allow:
        in a first configuration, the motor to be powered, and
        in a second configuration, the stator windings to be short-circuited when an accidental interruption of the electricity supply to the motor occurs.

20. An electromechanical system to be connected to an electricity supply, comprising:
    an electric machine that can operate as an independent generator, comprising a rotary shaft; and
    a switching system allowing:
        in a first configuration, the electric machine to operate as a motor in the case where a coupled device is normally driven or as a generator in the case where the coupled device is normally driving, and
        in a second configuration, the electric machine to operate as an independent generator, an electrical energy generated by the electric machine being dissipated in the machine and in a dissipative load,
    wherein the machine is self-excited in the second configuration.

21. The electromechanical system according to claim 20, wherein the switching system is configured to switch automatically from the first configuration to the second configuration in the event of an outage in the electricity supply powering the electric machine or powered by the latter and/or in the event of stopping of the machine.

22. The electromechanical system according to claim 20, wherein the system comprises a speed reducer or multiplier between the shaft and the device to be connected to the electromechanical system.

23. The electromechanical system according to claim 20, wherein
    the electric machine is a motor, and
    the switching system allows powering of the motor in the first configuration to drive the coupled device.

24. The electromechanical system according to claim 23, wherein the system comprises a frequency regulator to which the motor is connected.

25. The electromechanical system according to claim 20, wherein the system comprises a gear reducer.

26. The electromechanical system according to claim 20, wherein a reduction ratio is greater than 6.

27. The electromechanical system according to claim 26, wherein the reduction ratio ranges from 7 to 15.

28. The electromechanical system according to claim 20, wherein the system comprises the dissipative load.

29. The electromechanical system according to claim 28, wherein the dissipative load comprises at least one metal or electrolytic resistor.

30. The electromechanical system according to claim 20, wherein the dissipative load comprises at least one resistor immersed in a liquid bath.

31. The electromechanical system according to claim 20, wherein the switching system comprises at least one relay with a coil powered by the electricity supply.

32. The electromechanical system according to claim 20, wherein the switching system is configured to remain in the second configuration until a predefined command is received.

33. The electromechanical system according to claim 32, wherein the predefined command is issued by a frequency regulator.

34. The electromechanical system according to claim 20, wherein the system comprises a backspin speed control device for the machine configured to connect and disconnect the dissipative load of the machine and/or act upon the current flowing toward the dissipative load so that the backspin speed remains between two predefined thresholds.

* * * * *